United States Patent
Siems et al.

(10) Patent No.: US 6,756,716 B2
(45) Date of Patent: Jun. 29, 2004

(54) INSULATION ELEMENT AND METHOD FOR INTRODUCING WINDING ELEMENTS INTO GROOVES ON AN ARMATURE

(75) Inventors: Hans-Dieter Siems, Eberdingen (DE); Oswald Antl, Ottbergen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/110,118

(22) PCT Filed: Jul. 17, 2001

(86) PCT No.: PCT/DE01/02671

§ 371 (c)(1),
(2), (4) Date: Apr. 5, 2002

(87) PCT Pub. No.: WO02/23697

PCT Pub. Date: Mar. 21, 2002

(65) Prior Publication Data

US 2002/0153801 A1 Oct. 24, 2002

(30) Foreign Application Priority Data

Sep. 12, 2000 (DE) .......................................... 100 44 937

(51) Int. Cl.⁷ ................................................. H02K 3/15
(52) U.S. Cl. ..................................................... 310/215
(58) Field of Search ................................ 310/215, 217, 310/218

(56) References Cited

U.S. PATENT DOCUMENTS

| | | | | |
|---|---|---|---|---|
| 4,028,573 A | * | 6/1977 | Terrone | 310/217 |
| 4,037,312 A | * | 7/1977 | Deis | 29/598 |
| 4,876,473 A | * | 10/1989 | Tanaka et al. | 310/216 |
| 5,341,561 A | * | 8/1994 | Schorm et al. | 29/596 |
| 5,710,473 A | * | 1/1998 | Nobe et al. | 310/236 |
| 5,729,885 A | | 3/1998 | Carosa et al. | 29/598 |
| 6,147,430 A | * | 11/2000 | Kusase et al. | 310/215 |

FOREIGN PATENT DOCUMENTS

| | | | | |
|---|---|---|---|---|
| FR | 2 328 318 A | | 5/1977 | ............ H02K/3/36 |
| JP | 2001-346349 | * | 12/2001 | ............ H02K/3/46 |

* cited by examiner

Primary Examiner—Burton S. Mullins
Assistant Examiner—Nguyen Hanh
(74) Attorney, Agent, or Firm—Michael J. Striker

(57) ABSTRACT

The present invention relates to an insulator element for lining at least one armature slot of an electrical machine.

According to the invention, it is provided that the insulator element (10) has at least one plastic element (11), which is intended for lining an armature slot.

The present invention also relates to methods for inserting winding elements into the slots of an armature.

The present invention further relates to apparatuses for performing the methods of the invention.

16 Claims, 1 Drawing Sheet

INSULATION ELEMENT AND METHOD FOR INTRODUCING WINDING ELEMENTS INTO GROOVES ON AN ARMATURE

BACKGROUND OF THE INVENTION

The present invention relates to an insulator element for lining at least one armature slot of an electrical machine. The present invention furthermore relates to a method for inserting winding elements into the slots of an armature and to an apparatus for performing the method.

PRIOR ART

It is known to line the slots of the armature of an electrical machine with the thinnest possible strips of paper. Lining the slots in this way serves to avoid damage to the winding elements, which for instance are in the form of painted copper wires, both in assembly and in offsetting at the sharp stamped edges of the lamination packets. The paper insulation used also offers a clamping action on the winding elements in the axial direction, so that the armature can be turned upon assembly. However, a paper insulation in the armature slot of this kind does not offer a radial hold for the winding elements. The radial change in location of the winding elements that is thus possible can adversely affect the initial imbalance of the armature. In addition to the introduction of the paper insulation, still another operation, known as "widening", is necessary to make it possible to introduce the winding elements, for instance in the form of copper wires, into the slots. As a further work step, the armature is often also impregnated with epoxy resin by means of immersion rolling. This positionally fixes the winding elements together with the paper in the armature slot. Also by means of this work step, a thermal binding to the armature packet can be attained. A disadvantage of this known procedure is that introducing the paper strips and the subsequent work steps are complicated, which is why especially in automated procedures, long cycle times are unavoidable.

SUMMARY OF THE INVENTION

Because the insulator element of the invention has at least one plastic element that is intended for lining an armature slot, the lining process can be performed quickly, which makes short cycle times possible in an automated procedure.

Preferably, each plastic element provided for lining an armature slot is tubular. The length of the tubular plastic elements is preferably adapted to the length of the armature slots. Because of the tubular shape of the plastic elements, it is possible to adapt both to the shape of the armature slot and to the geometry of the winding elements, which are in the form of copper conductors, for instance. Thus the winding elements can be disposed in a defined way, which has a favorable effect on the initial imbalance of the armature.

It is also preferably provided that the plastic element has a rib on its outside. This rib makes it possible for the further portions of the plastic element to be made with extremely thin walls, since the rib lends adequate strength.

The rib can be provided in order to close the armature slot when the plastic element is introduced into the armature slot. This closure of the armature slot has a favorable effect on armature noise, for instance.

The internal cross section of the plastic element can be substantially in the form of a figure-8. Preferably, the upper and lower portions of the 8 are joined to one another.

Preferably, the plastic element has at least one longitudinal furrow on its inside. By this at least one longitudinal furrow, an axial fixation in the plastic element is made possible, both on the inner side and on the outer side. Moreover, the at least one longitudinal furrow assures not only a compensation for tolerances between the slot and the winding elements but also that the potting composition used in an ensuing impregnation bathes the conductors on both the inside and outside. As a result, an optimal connection of the individual components (armature packet, insulator element and winding elements) can be assured.

Especially with a view to automated assembly, it can be advantageous that a plurality of plastic elements are connected to one another by at least one first connecting element in such a way that their mutual location corresponds to the mutual location of a plurality of armature slots.

To enable problem-free introduction of the winding elements into the plastic elements, the first connecting element can have one or more winding guide faces.

In an especially preferred embodiment, the first connecting element is annular. On an annular connecting element, a number of plastic elements corresponding to the number of armature slots can be disposed, so that in automated assembly, all the armature slots can be simultaneously lined with plastic elements.

Particularly for this purpose, it is advantageous if the first connecting element connects first adjacent end portions of plastic elements that are disposed essentially parallel.

In this connection, it can be provided that the first annular connecting element connects the end faces of a plurality of plastic elements, and that the first annular element has openings, which are adapted essentially to the cross section of the plastic elements. The aforementioned winding guide faces can in this respect be provided especially advantageously in the region of the openings. Moreover, an accumulation of material on one side of the annular connecting element can be achieved, which makes it easier to extrude the thin-walled plastic elements.

Moreover, a second connecting element can be provided. By means of this second connecting element, the plastic elements can be fixed in their mutual location over their full length.

The second connecting element is also preferably annular, especially if the first connecting element is annular.

This annular second connecting element can then connect the other adjacent end portions of the plastic elements that are disposed essentially parallel.

To that end, the annular second connecting element surrounds the plastic elements, preferably in such a way that the outside of the plastic elements rests on the inside of the annular second connecting element or is joined to it.

Especially in this case, it is advantageous that the second connecting element is connected to the plastic elements via rated breaking points. If desired, after the plastic elements have been introduced into the armature slots, the second connecting element can be sheared off manually or by an assembly tool. An ensuing metal-cutting operation for removing the connecting element is also conceivable, such as turning the outer diameter of the armature on a lathe. By the cooperation of the first connecting element and the second connecting element with the plastic elements, the insulator elements thus formed are protected against damage, for instance during shipping. Moreover, such insulator elements can be stored and/or shipped as bulk goods, since the individual insulator elements can be effectively prevented from catching on one another. In contrast to the conventional paper inlays, the insulator elements of the invention can thus be delivered with conventional "pick and place" equipment without major effort.

The second connecting element can also have at least one guide face, which is intended to facilitate the mounting of the insulator element on the armature. In this connection, it is for instance conceivable for an annular second connecting element that is disposed on the other end portions of the plastic elements to be widened radially toward the end of the insulator element. In that case, the annular second connecting element upon introduction of the plastic elements into the armature slots slides over the armature surface that is interrupted by the armature slots.

Because the method of the invention for inserting winding elements into the slots of an armature includes the following steps:

a) introducing an insulator element of one of claims 1–17 into at least one armature slot; and b) inserting armature winding elements into the at least one plastic element, it is possible, for instance in an automated procedure, to shorten the cycle times markedly. This offers a simple way of meeting the demands made in terms of the slot insulation, mechanical strength upon offsetting of the conductors, automated introduction of the winding elements, for instance in the form of copper wires, and the prefixation of the winding elements in the axial and radial directions.

In the method of the invention, the following further step is preferably provided:

c) filling interstices between plastic elements and armature slots and/or plastic elements and winding elements with potting composition.

This potting composition can for instance be formed by a resin, which assures an optimal joining of the individual components.

The method of the invention furthermore preferably provides that at least one connecting element is removed after the introduction of the insulator element into the slots. The connecting element to be removed can for instance be formed by the annular second connecting element, which is joined to the plastic elements by the rated breaking points. In that case, the annular second connecting element can simply be sheared off. Especially if rated breaking points are absent, however, a metal-cutting method is also conceivable for removing a connecting element.

Apparatuses that are suitable for performing the method of the invention are also covered by the patent scope of the associated claims.

BRIEF DESCRIPTION OF THE DRAWINGS

The invention is described in further detail below in conjunction with the associated drawing.

Shown is.

DESCRIPTION OF THE PREFERRED EMBODIMENTS

Figure 1:
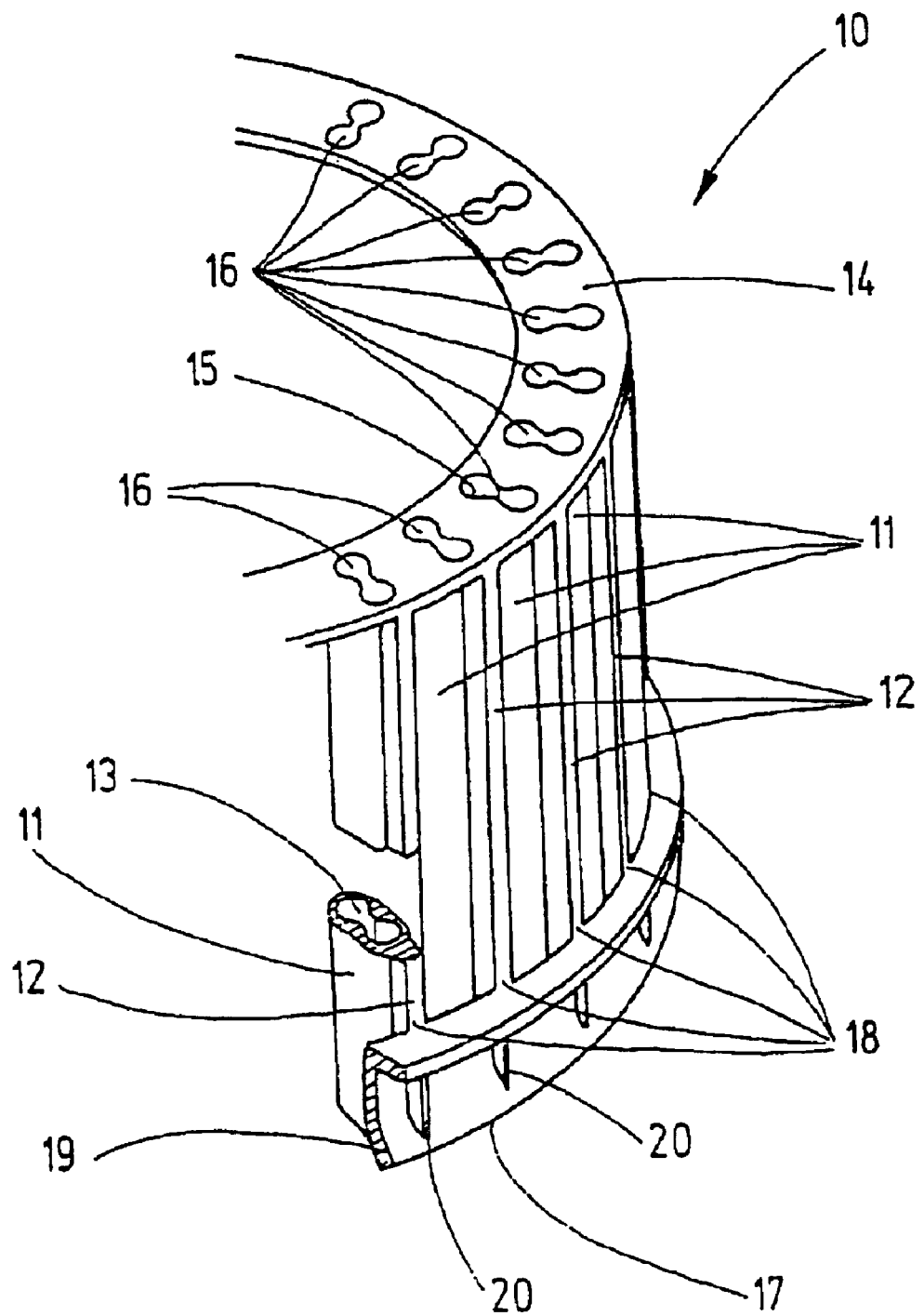
FIG. 1, an exemplary embodiment of the insulator element of the invention.

In FIG. 1, part of an overall circular-annular insulator element 10 is shown. The insulator element 10 has many plastic elements 11, which are embodied tubularly. The internal cross section 13 of the tubular plastic elements 11 is substantially in the form of a FIG. 8, as can be seen from the frontmost plastic element that is shown partly cut away.

All the plastic elements 11 have a rib 12 on their outside. The ribs 12 lend adequate strength so that the remaining portions of the plastic elements 11 can be made with extremely thin walls; injection molding in particular can be considered for the production method.

The many parallel plastic elements 11, all disposed annularly, are joined together by a first annular connecting element 14. In the embodiment shown, the first annular connecting element 14 connects the end faces on one end of the plastic elements 11. The annular first connecting element 14 also has many openings, which are adapted essentially to the cross section of the plastic elements 11. Although this is not shown in detail in FIG. 1, the annular first connecting element 14 has many winding guide faces 15, which are intended to facilitate the introduction of winding elements.

In the region of the other end portion of the plastic elements 11, a likewise annular second connecting element 17 is provided, which surrounds the plastic elements 11. The annular second connecting element 17 is connected to the plastic elements 11 via rated breaking points 18. This makes it possible for the second connecting element 17, after the plastic elements 11 have been introduced into the armature slots, to be removed by a simple shearing operation. The annular second connecting element 17 has an approximately semicircular cross section, and corresponding partitions 20 are provided to reinforce the annular second connecting element 17. Because of the approximately semicircular cross section of this connecting element 17, a guide face 19 is formed, which widens radially in the direction of the end of the insulator element 10. This guide face 19 makes it possible for the annular second connecting element 17 to be simply slipped over the edge of the end face of an armature so that it can then slide over the cylindrical outer face of the armature when the plastic elements 11 are introduced into the slots of the armature.

The insulator element 10 shown in FIG. 1 can especially advantageously be used with the method of the invention, if this method is done in automated fashion. To that end, the plastic elements 11 are first oriented relative to the armature slots, and then the plastic elements 11 are introduced into the armature slots, with the second connecting element 17 sliding as noted over the cylindrical surface, interrupted by the slots, of the armature. Since once the plastic elements 11 have been introduced into the armature slots, which are then closed by the ribs 12, the second connecting element protrudes past the surface of the armature, this connecting element is preferably removed, for instance by means of a shearing operation, which can be automated.

By means of the method of the invention, performed as described, all the slots of the armature are simultaneously lined with the plastic elements 11, which compared to the conventional lining with paper makes for a considerable saving of time.

The above description of the exemplary embodiments of the present invention is intended solely for the sake of illustration and is not meant to limit the invention. Within the scope of the invention, various changes and modifications can be made without departing from the scope of the invention or its equivalents.

What is claimed is:

1. An insulator element for lining at least one armature slot of an electrical machine, characterized in that the insulator element (10) has at least one plastic element (11), which is intended for lining an armature slot, each plastic element (11) intended to line one armature slot is tubular, the plastic element (11) has a rib (12) on its side which is directed to an outside of the insulator element (10), the rib (12) is intended to close the armature slot when the plastic element (11) is introduced into the armature slot, and a plurality of plastic elements (11) are connected to one another by at least one first connecting element (14) in such a way that their mutual location corresponds to the mutual location of a plurality of armature slots.

2. The insulator element of claim 1, characterized in that the internal cross section (13) of the plastic element (11) is substantially in the form of a figure-8.

3. The insulator element of claim 1, characterized in that the plastic element (11) has at least one longitudinal furrow on its inside.

4. The insulator element of claim 1, characterized in that the first connecting element (14) has one or more winding guide faces (15), which are intended to facilitate the Introduction of winding elements.

5. The insulator element claim 1, characterized in that the first connecting element (14) is annular.

6. The insulator element of claim 5, characterized in that the first annular connecting element (14) connects the end faces of a plurality of plastic elements (11), and that the first annular element has openings (16), which are adapted essentially to the cross section of the plastic elements (11).

7. The insulator element claim 1, characterized in that the first connecting element (14) connects first adjacent end portions of plastic elements (11) that are disposed essentially parallel.

8. The insulator element for lining at least one armature slot of an electrical machine, characterized in that the insulator element (10) has at least one plastic element (11), which is intended for lining an armature slot, each plastic element (11), intended to line one armature slot is tubular, the plastic element (11) has a rib (12) on its side which is directed to an outside of the insulator element (10), the rib (12) is intended to close the armature slot when the plastic element (11) is introduced into the armature slot, and a second connecting element (17) is provided.

9. An insulator element of claim 8, characterized in that the second connecting element (17) is annular.

10. The insulator element of claim 9, characterized in that the annular second connecting element (17) connects the other adjacent end portions of the plastic elements (11) that are disposed essentially parallel.

11. The insulator element claim 9, characterized in that the annular second connecting element (17) surrounds the plastic elements (11).

12. The insulator element claim 8, characterized in that the second connecting element (17) is connected to the plastic elements (11) via rated breaking points (18).

13. The insulator element claim 8, characterized In that the second connecting element (17) has at least one guide face (19), which is intended to facilitate the mounting of the insulator element (10) on the armature.

14. A method for inserting winding elements into the slots of an armature, having the following steps:

a) introducing an insulator element (10) of claim 1 into at least one armature slot;

b) inserting armature winding elements into the at least one plastic element (11)

c) forming the at least one plastic element (11) tubular;

d) providing the at least one plastic element (11) with a rib (12) on its outside, which rib is directed to an outside of an insulator element (10);

e) closing the armature slot by the rib (12) when the plastic element (11) is introduced into it, and f) removing at least one connecting element (14, 17) after the introduction of the insulator element (10) into the slots.

15. The method of claim 14, characterized in that it includes the following further step:

c) filling interstices between plastic elements (11) and armature slots and/or plastic elements and winding elements with potting composition.

16. An apparatus for performing the method of claim 14.

* * * * *